United States Patent
Bhaskar et al.

(10) Patent No.: US 7,820,223 B2
(45) Date of Patent: Oct. 26, 2010

(54) SWEET POTATO FLAKE PROCESS

(75) Inventors: Ajay Rajeshwar Bhaskar, Allen, TX (US); Donald Vaughn Neel, Highland Village, TX (US); Michael Grant Topor, Little Elm, TX (US)

(73) Assignee: Frito-Lay North America, Inc., Plano, TX (US)

( * ) Notice: Subject to any disclaimer, the term of this patent is extended or adjusted under 35 U.S.C. 154(b) by 127 days.

(21) Appl. No.: 11/942,924

(22) Filed: Nov. 20, 2007

(65) Prior Publication Data

US 2009/0130292 A1 May 21, 2009

(51) Int. Cl.
*A23L 1/216* (2006.01)

(52) U.S. Cl. .................. 426/637; 426/640; 426/549; 426/808; 426/550; 426/560

(58) Field of Classification Search .............. 426/637, 426/640, 549, 808, 550, 560
See application file for complete search history.

(56) References Cited

U.S. PATENT DOCUMENTS

| | | | |
|---|---|---|---|
| 3,260,607 A | 7/1966 | Asselbergs et al. | |
| 6,777,020 B2 * | 8/2004 | Villagran et al. | 426/637 |
| 6,896,922 B2 * | 5/2005 | Kudo et al. | 426/541 |
| 2006/0204638 A1 | 9/2006 | Chen et al. | |
| 2006/0286242 A1 | 12/2006 | Villagran | |

FOREIGN PATENT DOCUMENTS

| | | | |
|---|---|---|---|
| JP | 60221047 A | | 11/1985 |
| JP | 62126941 A | | 6/1987 |
| JP | 2000-157197 | * | 6/2000 |
| KR | 100443132 B1 | | 7/2004 |
| WO | 2006135714 A2 | | 12/2006 |

OTHER PUBLICATIONS

JP2000-157197 Machine Translation, Ando, Jun. 2000.*
Translation of Ando JP 2000-157197, Jun. 2000.*

* cited by examiner

*Primary Examiner*—Steven L Weinstein
*Assistant Examiner*—Chaim Smith
(74) *Attorney, Agent, or Firm*—Colin P. Cahoon; James R. Gourley; Carstens & Cahoon, LLP

(57) ABSTRACT

The present invention discloses formulations for sheeted, baked sweet potato chips that have a light, crispy texture similar to a white potato chip. The ingredients are combined with water and oil to make a dough, which is then sheeted and cut into pieces. The pieces are baked to produce sweet potato snack chips.

24 Claims, 1 Drawing Sheet

SWEET POTATO FLAKE PROCESS

BACKGROUND OF THE INVENTION

1. Technical Field

The present invention relates to a method for making a baked snack food and more particularly to a method for making a baked, sheeted snack food having high contents of sweet potato.

2. Description of Related Art

Baked snack foods such as potato chips are popular consumer items for which there exists a great demand. Potato chips have a light, crispy texture and can be prepared by cooking slices of whole potatoes. The potatoes used to make prior art potato chips are variations of the plant specie *Solanum tuberosum*. This plant specie is perennial, and is commonly grown for its white-colored, edible starchy tuber. The *Solanum tubersum* potato will be referred to herein as a "white potato." Also, prior art potato chips made from while potatoes are referred to hereinafter as "white potato chips."

White potato chips can also be created by using white potato flakes and water to create a starchy dough. The dough is sheeted, cut into pieces of a desired shape, and cooked. The dough is compressed between a pair of counter rotating sheeter rollers that are located closely together, thereby providing a pinch point through which the dough is formed into sheets and then cut into a desired shape. Often the desired snack piece shape is that of a square or circle. After the dough is cut into pieces, the pieces are transported towards and through an oven, which reduces their moisture content to produce a baked fabricated white potato chip. The white potato chips are then sent to be packaged.

An alternative to the white potato is the sweet potato. Sweet potatoes are variations on the plant specie *Ipomoea batatas*. The most common sweet potatoes generally have an orange colored flesh that is mildly sweet in flavor. However, sweet potato flesh can vary in color between white, yellow, orange, and purple. Sweet potatoes are also good sources of vitamins, including vitamins A and E, minerals and other healthy compounds such as anti-oxidants. Vitamins and minerals are widely recognized as part of a healthy diet, and antioxidants may reduce the risk of heart disease and cancer. The United States Department of Agriculture (USDA) recommends consumption of between 5 and 13 servings of a variety of fruit and vegetables, including sweet potatoes, per day.

Prior art snack foods that incorporate sweet potatoes generally take the form of dehydrated slices of whole sweet potatoes. These prior art dehydrated slices are not sheeted snack chips and do not have the light, crispy texture of white potato chips desired by consumers. Attempts at sheeted sweet potato chips in the prior art have included trivial or insubstantial amounts of sweet potatoes, thus they are not nutritionally or organoleptically different from traditional white potato chips. Furthermore, no prior art snack chip has been able to deliver high levels of sweet potatoes in the form of a light, crispy snack chip produced from sheeted dough. Instead, prior attempts at high sweet potato content fabricated snack chips resulted in hard, chewy and crunchy snacks, which are less desirable to consumers. Consequently, the need exists for a healthy, nutritious snack chip having a high content of sweet potatoes and a light, crispy texture similar to a white potato chip.

SUMMARY OF THE INVENTION

The present invention thus provides a great tasting, healthy snack chip having a high content of sweet potatoes, and a form and texture similar to a white potato chip. In one embodiment, the snack chip of the present invention preferably has at least ⅓ serving of sweet potatoes per 1 ounce serving of snack chips. In another embodiment, the snack chip of the present invention has at least ½ serving of sweet potatoes per 1 ounce serving. In still another embodiment, the snack chip of the present invention has at least 1 serving of sweet potatoes per 1 ounce serving.

In one aspect of the invention, a hybrid sweet potato/white potato flake is used as an ingredient in sheeted, baked snack chips. In another aspect of the invention, blends of modified starch, rice flour and other ingredients are used to give the snack chips a light, crispy texture similar to a white potato chip. In yet another aspect of the present invention, sweet potato granules are optionally used as an ingredient, which provides additional sweet potato content and visual appeal of sweet potato inclusions to the consumer. These as well as additional features and advantages of the present invention will become apparent in the following written description.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
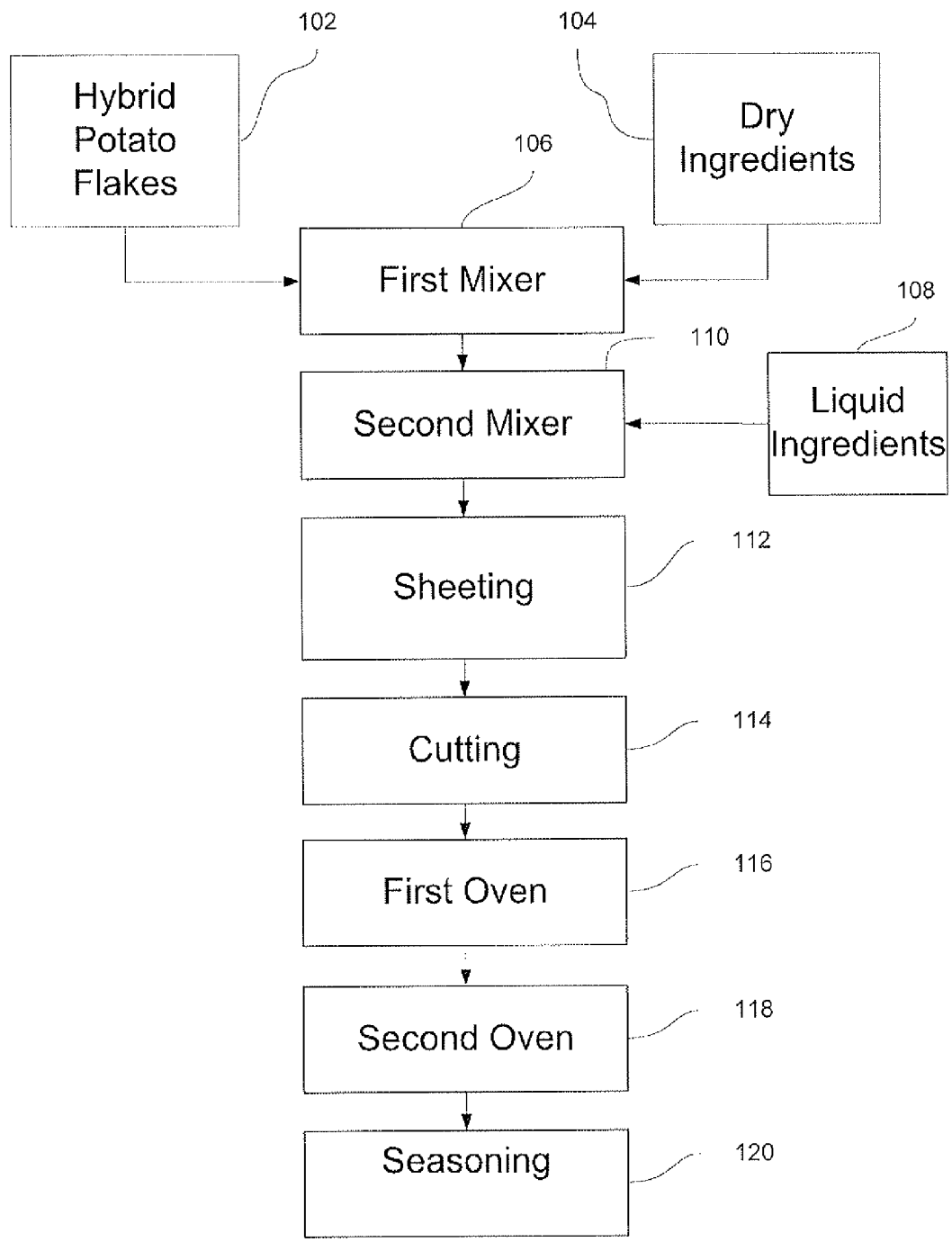
FIG. 1 is a flowchart indicating the processing steps for the present invention.

The baked snack chips of the present invention are high in sweet potato content. As used herein, the term "sweet potato" refers to root vegetable varieties of the plant specie *Ipomoea batatas*.

One of the ingredients that gives the baked chips of the present invention their high content of sweet potatoes is a hybrid sweet potato/white potato flake. These hybrid potato flakes are used as an ingredient in dough that is sheeted, cut into pieces of a desirable shape and cooked to produce sweet potato chips. As used herein, the term "hybrid potato flake" refers to a potato flake that comprises a mixture of sweet potato content and white potato content. It should be noted that the term "hybrid potato flake" does not refer to a mixture of sweet potato flakes and white potato flakes. As described more fully herein below, a mixture of sweet potato flakes or granules and white potato flakes will not accomplish the goals of the present invention. In the hybrid potato flake used with the present invention, each individual hybrid potato flake is partially sweet potato and partially white potato.

Hybrid potato flakes are made as follows: First, white potatoes and sweet potatoes are cooked. Each type of potato can be cooked together or separately depending on convenience and manufacturing considerations. In some embodiments, cooking the potatoes separately allows for the use of more varieties of potatoes that cook at different rates. The primary cooking method used with the present invention is submerging the potatoes in a hot water bath for a predetermined period of time. However, other methods known in the art can be used, such as heating by condensing steam, microwave, or hot air oven. Once the potatoes are cooked, they are mixed together and mashed together to create a hybrid potato mash. Optional ingredients can also be included in the hybrid potato mash. One optional ingredient is a mixture of monoand di-glycerides which aids, among other things, mash sheeting and flaking. Another is citric acid, which reduces non-enzymatic browning of the hybrid flakes during storage.

Next, the hybrid potato mash is spread in a thin layer onto a heated drum and dried. After it is dried, the moisture content of the dried sheet, and the flakes generated therefrom, have a moisture content between about 5% and 10% by weight, or preferably between about 5% and about 7% by weight. The thin sheet of dried mash on the drum is then broken and ground, or comminuted, into hybrid flakes. In one embodiment the particle size distribution of the hybrid potato flakes is as follows: between about 40% and about 50% sit on a #40 U.S. mesh screen; between about 25% and about 35% sit on a #60 U.S. mesh screen; between about 5% and about 15% sit on a #80 U.S. mesh screen; between about 3% and about 8% sit on a #100 U.S. mesh screen; and less than about 10% pass through a #100 U.S. mesh screen. All mesh screen sizes are based on the U.S. Sieve Scale and the opening size for each Mesh Screen is summarized in the following table:

TABLE 1

U.S. Sieve # Opening Sizes

| U.S. Sieve # | Opening Size | |
|---|---|---|
| | Millimeters | Inches |
| 20 | 0.853 | 0.0336 |
| 40 | 0.420 | 0.0165 |
| 60 | 0.250 | 0.0098 |
| 80 | 0.177 | 0.0070 |
| 100 | 0.149 | 0.0059 |

Because the hybrid potato mash is a mixture of white potatoes and sweet potatoes, each individual hybrid flake generated from the dried hybrid potato mash is also a mixture of white potato content and sweet potato content. The preferred hybrid potato mash comprises between about 30% and about 80% sweet potato and between about 20% and about 70% white potato by weight. Each resulting flake, therefore, has an average composition approximately equivalent to the composition of the mash. Thus, a flake produced from a 50/50 sweet potato/white hybrid potato mash will, on average, contain approximately 50% sweet potato and about 50% white potato.

This method of making hybrid potato flakes overcomes the difficulties encountered in producing desirable flakes from pure sweet potatoes. For example, unlike the hybrid mash described above, a 100% sweet potato mash cannot be spread onto a drum and dried because the pure sweet potato mash easily burns and discolors as it dries on the drum. A pure sweet potato mash also sticks to the drum during processing and requires more frequent cleaning of the drum during production, which is inefficient. Furthermore, if other methods are used whereby pure sweet potatoes are cooked, dried and comminuted, the resulting sweet potato product is not a desirable light flaky substance that can be used as a major ingredient in fabricated potato chips. Instead, cooked, dried and comminuted sweet potatoes generally form hard, dense granules. Snack chip dough that includes significant portions of these hard dense sweet potato granules will not effectively sheet and will not produce a snack chip that has the desirable light crispy texture of a white potato chip, but will have a very firm texture, even when the sweet potato granules are mixed with white potato flakes. The same result occurs when the granules are ground down into a fine flour-like substance.

The applicants herein have found that mixing cooked white potatoes and cooked sweet potatoes to create a hybrid mash, which is then dried and comminuted, unexpectedly produces a desirable hybrid potato flake. This hybrid potato flake is superior to the prior art sweet potato flakes or granules because, when it is used as a snack chip dough ingredient, the resulting dough effectively forms thin sheets of dough on a commercial scale and produces a final snack chip that has the desirable light crispy texture of a fabricated white potato chip. The particular problems of commercial scale production that are overcome are dough stickiness on the rollers and dough cohesion. In both of these areas, the hybrid flakes offer improved performance. Again, these results are surprising because pure sweet potato mash does not form desirable flakes when it is dried and comminuted. These results are also surprising because the hybrid potato flakes allow for more effective dough sheeting and produce a more desirable final product than does a mixture of sweet potato granules and white potato flakes, even when the amount of sweet potato contents in the hybrid flakes and the granule/flake mixture are equivalent.

Other hybrid mashes can also be produced by cooking non-sweet potato fruits or vegetables, mashing them with cooked white potatoes and/or other foodstuffs that are usually drum dried into flakes, and using the hybrid fruit or vegetable mash to create hybrid fruit or vegetable flakes. These hybrid fruit or vegetable flakes can then be used for other varieties of fabricated fruit or vegetable snack chips.

In one preferred embodiment, the snack chips of the present invention incorporate at least ⅓ serving of sweet potatoes per 1 ounce serving of the snack chips. In another preferred embodiment, the snack chips of the present invention incorporate at least ½ serving of sweet potatoes per 1 ounce serving of the snack chips. In yet another preferred embodiment, the snack chips of the present invention incorporate at least 1 serving of sweet potatoes per 1 ounce serving of the snack chips.

The United States Department of Agriculture (USDA) defines a serving of vegetables as ½ cup of chopped vegetables. For example, ½ cup of 1 inch cubes of raw sweet potato constitutes 1 serving of sweet potato under the USDA guidelines. A serving of vegetables can be understood as having a moisture content and a solids content. Sweet potato dry matter is defined herein as the non-water components of sweet potatoes. Thus, a serving of sweet potatoes comprises a sweet potato dry matter content on a dry basis. The USDA National Nutrient Database for Standard Reference defines the weight of the edible portion of a sweet potato in that ½ cup and defines the average moisture and thus the sweet potato dry matter content of the edible portion of a sweet potato. Table 1, for example, depicts the nutrient profile for 1-cup or 133 grams of sweet potato as accessed at http://www.nal.usda.gov/fnic/foodcomp/search/.

TABLE 2

Sweet Potatoes, Raw

| Nutrient Proximates | Units | Value per 100 grams | Number of Data Points | Std. Error | 1.00 × 1 cup, cubes 133 g |
|---|---|---|---|---|---|
| Water | g | 77.28 | 7 | 0.65 | 102.78 |
| Energy | kcal | 86 | 0 | | 114 |
| Energy | kj | 359 | 0 | | 477 |
| Protein | g | 1.57 | 4 | 0.145 | 2.09 |
| Total lipid (fat) | g | 0.05 | 4 | 0.033 | 0.07 |
| Ash | g | 0.99 | 4 | 0.056 | 1.32 |
| Carbohydrate, by difference | g | 20.12 | 0 | | 26.76 |
| Fiber, total dietary | g | 3.0 | 1 | | 4.0 |

TABLE 2-continued

Sweet Potatoes, Raw

| Nutrient Proximates | Units | Value per 100 grams | Number of Data Points | Std. Error | 1.00 × 1 cup, cubes 133 g |
|---|---|---|---|---|---|
| Sugars, total | g | 4.18 | 0 | | 5.56 |
| Starch | g | 12.65 | 4 | 2.709 | 16.82 |

USDA National Nutrient Database for Standard Reference, Release 19 (2006)

As used herein, a serving of sweet potatoes is defined as the amount of sweet potato dry matter content that is equivalent to ½ cup (118 cubic centimeters) of chopped sweet potatoes on a dry basis based on the USDA National Nutrient Database for Standard Reference, Release 19, 2006, which is incorporated herein by reference. According to Table 1, one cup of raw sweet potatoes weighs 133 grams, has a water content of 77.28% by weight and a sweet potato dry matter content of 22.72%. One serving of raw sweet potatoes (½ cup) has a total weight of 66.5 grams. Consequently, 15.11 grams (23.12% dry matter content×66.5 grams total weight) of sweet potato dry matter in a finished product is equivalent to one serving of sweet potatoes. Thus, a snack chip having a one-third serving of sweet potato would have approximately 5.04 grams of sweet potato dry matter in a 1 ounce serving of chips, a snack chip having a one-half serving of sweet potato would have approximately 7.55 grams of sweet potato dry matter in a 1 ounce serving of chips, and a snack chip having one serving of sweet potato would have approximately 15.11 grams of sweet potato dry matter in a 1 ounce serving of chips.

Consequently, in one embodiment, sweet potato can be added to the snack chip dough in the form of hybrid potato flakes and, optionally, sweet potato granules in an amount sufficient to provide for a one-third serving of sweet potato, in a preferred embodiment in an amount sufficient to provide for a one-half serving of sweet potato, and in another preferred embodiment in an amount sufficient to provide for one serving of sweet potato. As used herein, one serving of sweet potatoes is defined as the amount of sweet potato dry matter that is equivalent to ½ cup (133 cubic centimeters) of chopped sweet potatoes on a dry basis based on the USDA National Nutrient Database for Standard Reference, Release 19, 2006, which is incorporated herein by reference.

To produce sweet potato chips, the hybrid potato flakes are mixed with other dry ingredients, water and oil to form a dough. Optionally, natural or artificial colors can be included as ingredients in the dough. The other dry ingredients help maintain dough cohesiveness and expansion during cooking, and contribute to the final product light, crispy texture and enhanced flavor, among other things. The other dry ingredients are comprised of a dry matter component and a moisture component. The dry matter component of any dry ingredient, as that term is used herein, is defined as the non-water components of that particular dry ingredient. For example, rice flour has a rice flour dry matter component and a rice flour moisture component. The rice flour dry matter component is defined as all of the non-water components that make up the rice flour. The moisture component of each dry ingredient, as used herein, is defined as the water component of each dry ingredient.

Thus, the moisture component for the rice flour is defined as all of the water in the rice flour. The moisture component of each dry ingredient will typically be less than about 10.5% by weight of the particular dry ingredient.

In one embodiment rice flour is included as an ingredient in the dough to maintain cohesiveness, contribute to the final product texture and reduce breakage of the final product. The rice flour has a rice flour dry matter component and a moisture component. In a more preferred embodiment, the rice flour is pre-gelatinized rice flour. Pre-gelatinized rice flour is rice flour that has a starchy component that has undergone an irreversible loss of molecular order, which allows it to more easily form pastes or gels when mixed with water. An example of pre-gelatinized rice flour suitable for use in the present invention can be obtained from Sage V Foods, under the brand RF GLX080.

In one embodiment, white potato flakes are optionally included as an ingredient to help the dough expand as it cooks, and give the final product its light, crispy texture. The white potato flakes have a white potato flakes dry matter component and a moisture component. White potato flakes are made from white potatoes that have been cooked, mashed, dried and flaked. For example, Idaho Pacific Corporation in Ririe, Id. produces potato flakes under the brand name Potato Flakes #124 that can be used as herein described.

In one embodiment, modified starch is included as an ingredient in the dough to aid cohesiveness, expansion, texture, and breakage reduction. The modified starch has a modified starch dry matter component and a moisture component. An example of a modified starch that can be used in the present invention is XPAND'R starch, available from AE Staley Manufacturing Company, headquartered in London, U.K.

In one embodiment, sweet potato granules are optionally included as an ingredient in the dough of the present invention. Sweet potato granules are made from whole sweet potatoes that have been cooked, dried and comminuted into granule particles. In one embodiment the particle size distribution of the sweet potato granules is as follows: between about 40% and about 50% sit on a #20 U.S. mesh screen; between about 25% and about 35% sit on a #40 U.S. mesh screen; between about 10% and about 15% sit on a #60 U.S. mesh screen; between about 1% and about 6% sit on a #80 U.S. mesh screen; between about 0.5% and about 4% sit on a #100 U.S. mesh screen; and less than about 6% pass through a #100 U.S. mesh screen. The inclusion of sweet potato granules imparts additional sweet potato content and enhanced visual appeal of visible sweet potato inclusions. Sweet potato granules should not exceed 15% of the dough mixture on a dry basis because at higher levels the resulting dough will not effectively sheet.

In other embodiments, other ingredients are optionally included in minor amounts in the product formulation. For example, sodium bicarbonate and/or mono-calcium phosphate can be included in minor amounts as leavening and sheeting aids. Sugar can also be added to enhance the product's flavor. Hard stock can be added to improve final product texture. Hard stock is hydrogenated oil with an Iodine value less than 5 and a melting point greater than 150° F. Soy lecithin is an emulsifier that can also be added to improve final product texture. Lecithin is a mixture of various phospholipids extracted from soybean oil, and can be used in a deoiled granulated or liquid form.

In one preferred embodiment of the sweet potato chips, water and corn oil are mixed with the hybrid potato flakes and dry ingredients to make a dough. The resultant dough comprises about 30% to about 70% hybrid potato flakes, about 5% to about 15% modified starch and about 5% to about 30% rice flour on a dry basis. The dough also comprises between about 20% and about 40% added water. All percentages used herein are by weight unless otherwise noted.

In a more preferred embodiment of the sweet potato chips, the resultant dough comprises about 40% to about 70% hybrid potato flakes, about 5% to about 13% modified starch and about 5% to about 25% rice flour on a dry basis. The dough also comprises between about 20% and about 40% added water.

In a most preferred embodiment of the sweet potato chips, the resultant dough comprises about 40% to about 60% hybrid potato flakes, about 5% to about 12% modified starch and about 5% to about 23% rice flour on a dry basis. The dough also comprises between about 30% and about 40% added water.

Referring to FIG. 1, therein is depicted a flowchart indicating the general processing steps for producing the sweet potato chips of the present invention. In the first processing step, the hybrid potato flakes 102 and other dry ingredients 104 are mixed in a first mixer 106. These ingredients are then combined with water and other liquid ingredients 108 in a second mixer 110 to produce a dough. The dough preferably exits the second mixer between about 60° F. and about 80° F. Controlling the water temperature helps to control the dough temperature.

The dough then undergoes a sheeting step 112, whereby the dough is compressed between at least one pair of counter rotating sheeter/cutter rollers that are located closely together, thereby providing a pinch point through which the dough is formed into sheets. The sheet of dough for the sweet potato chips is preferably between about 0.027 inches and about 0.035 inches thick, and more preferably about 0.033 inches thick after the sheeting step. The preferred thickness is preferably accomplished by passing the dough through several successive stages of rollers, with each successive stage having the rollers located progressively closer together, more preferably 2, 3 or 4 stages of rollers. Passing the dough through several stages of rollers minimizes the amount of work done on the dough during the sheeting step by any particular set of rollers, thereby reducing the influence of the sheeting step on the physical properties of the dough that are established during the mixing step. In some cases the rollers are preferably chilled to between about 35° F. and about 65° F. to reduce the likelihood of the dough sticking to the rollers.

The sheet of dough is then cut into a plurality of pieces 114, preferably using a rotary cutting unit. The pieces are then cooked. In one embodiment, the pieces are baked in a first oven 116 at an oven temperature between about 350° F. and about 540° F. until they have a moisture content between about 5% and about 15%. The pieces are then baked in a second oven 118 at an oven temperature between about 235° F. and about 280° F. to form sweet potato chips having a final moisture content between about 2% and about 4% of the total product weight. Alternatively, the dough pieces can be cooked by any method known in the art. The snack chips can then optionally be seasoned 120 in an oil spray and seasoning tumbler and then packaged.

The resultant sweet potato chip in one preferred embodiment comprises at least about 18% sweet potato dry matter, less than about 3% corn oil and less than about 4% water. The resultant sweet potato chip in another preferred embodiment comprises at least about 27% sweet potato dry matter, less than about 3% corn oil and less than about 4% water. In one embodiment, all of the sweet potato dry matter present in the final sweet potato chip originates from the hybrid potato flakes used in the initial ingredient mixture. In another embodiment, the sweet potato dry matter in the final chip originates from both hybrid potato flakes and sweet potato granules used in the initial ingredient mixture.

The nutritional goals for the snack chips of the present invention include, per 1 ounce serving of snack chips: no more than 5 g of fat, 1 gram or less of saturated fat, zero trans-fatty acids, less than 25% calories from added sugar, and no more than 240 milligrams of sodium.

EXAMPLE

The table below illustrates an example of the ingredients and their relative amounts that were used to make a sweet potato chip dough according to the present invention:

TABLE 3

| Ingredient | Wt. % Dry Ingredients | Wt. % Dough |
|---|---|---|
| Hybrid Potato Flakes | 50.00% | 32.81% |
| Sweet Potato Granules | 10.00% | 6.56% |
| Modified Starch | 10.00% | 6.56% |
| Rice Flour | 19.68% | 12.91% |
| Sugar | 6.00% | 3.94% |
| Corn Oil | 1.60% | 1.05% |
| Hard Stock | 0.80% | 0.52% |
| Soy Lecithin | 1.00% | 0.66% |
| Monocalcium Phosphate | 0.52% | 0.34% |
| Sodium Bicarbonate | 0.40% | 0.26% |
| Added Water | — | 34.38% |

In this embodiment, the hybrid potato flakes and other dry ingredients were mixed together in a batch mixer. The hybrid potato flakes used in this example comprised about 50% sweet potato and about 50% white potato. Next, the well mixed dry ingredients, water and oil were combined in a twin screw continuous wet mixer for about 30 to about 60 seconds to create the dough. The dough exited the mixer at between 68° F. and 88° F. The dough was then sheeted using 4 stages of rollers to produce a sheet of dough about 0.035 inches thick. The sheet of dough then passed through a rotary cutting step that produced a plurality of square shaped pieces of dough. The pieces were then baked in an 8-zone Wolverine double (top and bottom) jet impingement oven at 375° F. to 500° F. to produce partially baked snack pieces having a total moisture content between 5% and 15% by weight. The partially baked pieces were then allowed to cool. The cooled pieces were then dried in a 2 zone Wenger convection oven at 260° F. to 280° F. until the pieces had a final moisture content between 2% and 4%. The final snack pieces were then seasoned using a tumbler, where they were lightly sprayed with oil and seasoning.

The sweet potato chips described in the above example contained at least ½ serving of sweet potatoes, or at least about 26% sweet potato dry matter by weight. They also had a light, crispy texture similar to that of a white potato chip. In addition, the sweet potato chips disclosed herein met or exceeded the other preferred nutritional goals. Specifically, the chips disclosed above had, per 1 ounce serving, less than 5 g of fat, 1 grain or less of saturated fat, zero trans-fatty acids, less than 25% calories from added sugar, and no more than 240 milligrams of sodium. In sum, the result is a healthy, nutritious snack chip high in sweet potato content and having a light, crispy texture similar to a white potato crisp.

What is claimed is:

1. A sweet potato chip dough comprising:
   added water; and
   hybrid potato flakes, wherein each said hybrid potato flake comprises:
   sweet potato; and
   white potato.

2. The dough of claim 1 wherein said hybrid potato flakes comprise by weight:
about 30% to about 80% said sweet potato; and
about 20% to about 70% said white potato.

3. The dough of claim 1 wherein said hybrid potato flakes comprise by weight:
a ratio of said sweet potato to said white potato of about 1:1.

4. The dough of claim 1 further comprising by weight:
about 20% to about 40% said added water; and
a dry mix comprising:
about 30% to about 70% said hybrid potato flakes;
about 5% to about 15% modified starch; and
about 5% to about 30% rice flour.

5. The dough of claim 1 further comprising by weight:
about 20% to about 40% said added water; and
a dry mix comprising:
about 40% to about 70% said hybrid potato flakes;
about 5% to about 13% modified starch; and
about 5% to about 25% rice flour.

6. The dough of claim 1 further comprising by weight:
about 30% to about 40% said added water; and
a dry mix comprising:
about 40% to about 60% said hybrid potato flakes;
about 8% to about 12% modified starch; and
about 17% to about 23% rice flour.

7. The dough of claim 1 further comprising:
sweet potato granules.

8. The dough of claim 7 further comprising by weight:
less than about 15% said sweet potato granules.

9. The dough of claim 1 wherein each said hybrid flake further comprises at least one of citric acid and a mixture of mono- and di-glycerides.

10. A sweet potato chip comprising by weight:
at least about 17% sweet potato dry matter;
rice flour dry matter;
modified starch dry matter;
less than about 3% corn oil; and
less than about 4% water wherein said sweet potato dry matter originates from hybrid potato flakes, and wherein each said hybrid potato flake comprises: sweet potato; and white potato.

11. The sweet potato chip of claim 10 further comprising by weight:
at least about 26% sweet potato dry matter.

12. The sweet potato chip of claim 10 wherein said sweet potato dry matter further originates from sweet potato granules.

13. The sweet potato chip of claim 10 wherein said sweet potato dry matter comprises at least one-third serving of sweet potatoes per one ounce serving of sweet potato chips.

14. The sweet potato chip of claim 10 wherein said sweet potato dry matter comprises at least one-half serving of sweet potatoes per one ounce serving of sweet potato chips.

15. The sweet potato chip of claim 10 additionally comprising:
less than about 5 grams of fat;
about 1 gram or less of saturated fat;
about 0 grams of trans-fatty acids;
less than about 25% calories from added sugar; and
less than 240 milligrams of sodium.

16. The sweet potato chip of claim 10 wherein said sweet potato dry matter comprises at least one serving of sweet potatoes per one ounce serving of sweet potato chips.

17. The sweet potato chip of claim 10 wherein each said hybrid potato flake further comprises at least one of citric acid and a mixture of mono- and di-glycerides.

18. A method for making sweet potato snack chips, said method comprising:
providing hybrid potato flakes, wherein each said hybrid potato flake comprises:
sweet potato; and
white potato;
providing a dry ingredient mix comprising:
rice flour; and
modified starch;
combining said hybrid potato flakes with said dry ingredient mix, oil and water to make a dough;
sheeting said dough to produce a dough sheet;
cutting said dough sheet to produce dough pieces;
cooking said dough pieces to produce said sweet potato snack chips.

19. The method of claim 18 wherein said providing hybrid potato flakes further comprises:
providing raw sweet potatoes;
providing raw white potatoes;
cooking said raw sweet potatoes to produce cooked sweet potatoes;
cooking said raw white potatoes to produce cooked white potatoes;
mashing said cooked sweet potatoes and said cooked white potatoes together to produce a hybrid potato mash;
drying said hybrid potato mash to produce a dried hybrid potato mash;
comminuting said dried hybrid potato mash to produce hybrid potato flakes.

20. The method of claim 19 wherein said cooking further comprises at least one of:
heating said sweet potatoes and said white potatoes in a hot water bath; and
heating said sweet potatoes and said white potatoes in a steam bath.

21. The method of claim 18 wherein said dry ingredients further comprise sweet potato granules.

22. The method of claim 18 wherein said cooking of said dough pieces further comprises baking said dough pieces in at least one oven.

23. The method of claim 18 wherein said hybrid potato flakes have a particle size distribution comprising:
between about 40% and about 50% sit on a #40 U.S. mesh screen;
between about 25% and about 35% sit on a #60 U.S. mesh screen;
between about 5% and about 15% sit on a #80 U.S. mesh screen;
between about 3% and about 8% sit on a #100 U.S. mesh screen; and
less than about 10% pass through a #100 U.S. mesh screen.

24. The method of claim 21 wherein said sweet potato granules have a particle size distribution comprising:
between about 40% and about 50% sit on a #20 U.S. mesh screen;
between about 25% and about 35% sit on a #40 U.S. mesh screen;
between about 10% and about 15% sit on a #60 U.S. mesh screen;
between about 1% and about 6% sit on a #80 U.S. mesh screen;
between about 0.5% and about 4% sit on a #100 U.S. mesh screen; and
less than about 6% pass through a #100 U.S. mesh screen.

* * * * *